United States Patent
Arakawa et al.

(10) Patent No.: US 11,605,990 B2
(45) Date of Patent: Mar. 14, 2023

(54) ANNULAR CORE PIECE AND ANNULAR CORE

(71) Applicant: MITSUI HIGH-TEC, INC., Fukuoka (JP)

(72) Inventors: Hirokazu Arakawa, Fukuoka (JP); Yusuke Hasuo, Fukuoka (JP)

(73) Assignee: MITSUI HIGH-TEC, INC., Fukuoka (JP)

( * ) Notice: Subject to any disclaimer, the term of this patent is extended or adjusted under 35 U.S.C. 154(b) by 768 days.

(21) Appl. No.: 16/483,234

(22) PCT Filed: Jan. 29, 2018

(86) PCT No.: PCT/JP2018/002684
§ 371 (c)(1),
(2) Date: Aug. 2, 2019

(87) PCT Pub. No.: WO2018/147112
PCT Pub. Date: Aug. 16, 2018

(65) Prior Publication Data
US 2020/0014256 A1    Jan. 9, 2020

(30) Foreign Application Priority Data

Feb. 10, 2017  (JP) .............................. JP2017-022766

(51) Int. Cl.
*H02K 1/18* (2006.01)
*H02K 15/02* (2006.01)
(52) U.S. Cl.
CPC ............... *H02K 1/18* (2013.01); *H02K 15/02* (2013.01)

(58) Field of Classification Search
CPC .............................. H02K 1/185; H02K 15/02
(Continued)

(56) References Cited

U.S. PATENT DOCUMENTS

| 2,715,193 A | 8/1955 | Staley |
| 2,790,918 A * | 4/1957 | Goran ................... H02K 1/143 |
| | | 310/216.049 |
| 2009/0189477 A1 | 7/2009 | Yamamoto |

FOREIGN PATENT DOCUMENTS

| CN | 101461119 | 6/2009 |
| CN | 202268754 U | 6/2012 |

(Continued)

OTHER PUBLICATIONS

International Search Report issued in PCT/JP2018/002684, dated Mar. 20, 2018.

(Continued)

*Primary Examiner* — Jose A Gonzalez Quinones
(74) *Attorney, Agent, or Firm* — Greenblum & Bernstein, P.L.C.

(57) ABSTRACT

An annular core piece in which an annular core piece can be received inside a contour of an outer circumstance of the annular core piece and the number of recesses formed on the outer circumstance is small is provided. In an annular core piece including a plurality of recesses opened in an outer circumferential part, the recess includes a narrowed part and a raised part, and a transverse width of the narrowed part is made narrower than a transverse width of a different region present on a side of a bottom of the recess further beyond the narrowed part, and the raised part is formed such that a part of the bottom of the recess is raised and projected toward an opening end of the recess.

9 Claims, 5 Drawing Sheets

(58) Field of Classification Search
USPC .................................... 310/216.049, 216.055
See application file for complete search history.

(56) References Cited

FOREIGN PATENT DOCUMENTS

| | | | | |
|---|---|---|---|---|
| CN | 202772684 A | * | 3/2013 | |
| CN | 203301331 U | | 11/2013 | |
| CN | 104967228 A | | 10/2015 | |
| EP | 2 026 448 A1 | | 2/2009 | |
| GB | 2 423 421 A | | 8/2006 | |
| JP | 6-90050 A | | 3/1994 | |
| JP | 6-90550 A | | 3/1994 | |
| JP | 7-231588 A | | 8/1995 | |
| JP | 9-117111 A | | 5/1997 | |
| JP | 10225027 A | * | 8/1998 | |
| JP | 2008-141904 A | | 6/2008 | |
| JP | 2013-123345 A | | 6/2013 | |
| JP | 2014193000 | * | 10/2014 | |
| WO | WO2010131560A-1 | * | 11/2010 | |
| WO | WO-2016067532 A1 | * | 5/2016 | ............... H02K 1/12 |
| WO | WO-2017149593 A1 | * | 9/2017 | ............... H02K 1/14 |

OTHER PUBLICATIONS

Written Opinion issued in PCT/JP2018/002684, dated Mar. 20, 2018.
Japan Official Action received in JP Application No. 2017-022766 and English translation thereof, dated Apr. 28, 2020.

* cited by examiner

ANNULAR CORE PIECE AND ANNULAR CORE

TECHNICAL FIELD

The present invention relates to an annular core piece, and an annular core formed by laminating the annular core pieces.

BACKGROUND ART

An annular core is formed by laminating annular core pieces, and is a component forming an armature of a rotating electric machine. As described in Patent Literature 1, the annular core piece is manufactured by being blanked from an electromagnetic steel plate using a press die. The downward side of the press die is provided with a laminating die (die) for holding the electromagnetic steel plate with the electromagnetic steel plate pinched (FIG. 5(A) of Patent Literature 1). The annular core pieces blanked from the electromagnetic steel plate are sequentially laminated and held inside the laminating die.

However, in recent years, the annular core piece tends to become thinner and become larger in diameter. Accordingly, the annular core piece tends to become lower in rigidity. When the annular core piece having the low rigidity is subjected to a force of a plane direction from the laminating die, the annular core piece may be deformed like a swell. As a result, the annular core piece may be partially lifted from an upper surface of the laminating die, and it may become difficult to blank and laminate the annular core pieces subsequently (FIG. 5(B) of Patent Literature 1). Alternatively, the dimensional accuracy of the annular core may be reduced.

In order to solve the above problem, Patent Literature 1 discloses that an outer circumstance of an annular core piece is provided with a recess (a linear recess) functioning as a kind of dovetail groove and a laminating die is provided with a protrusion (a linear raised part) engaged to the recess. Since engagement between the recess and the protrusion prevents deformation of the annular core piece, there is no situation in which the annular core pieces cannot be laminated during a laminating process or the dimensional accuracy of the annular core is reduced. That is, Patent Literature 1 discloses that the outer circumstance of the annular core piece is provided with the recess for preventing the deformation of the annular core piece by being engaged to the protrusion included in the laminating die.

Also, the laminated annular core pieces are coupled by mutually welding the annular core pieces adjacent in a lamination direction. Patent Literature 2 discloses a method for manufacturing an annular core in which an outer circumstance of an annular core piece is formed with a recess and the inside of the recess is provided with a raised part raised from the bottom of the recess and the raised parts of the annular core pieces adjacent in a lamination direction are welded.

By welding inside the recess formed in the outer circumstance of an annular core piece in this manner, a deposited metal is not projected to the outside of the annular core. As a result, when the annular core is fitted into a casing of a rotating electric machine, the deposited metal does not interfere with the casing. Also, by welding the raised part present inside the recess and raised from the bottom of the recess, the range of a weld heat-affected zone is limited, and this can decrease distortion of the annular core occurring after welding. That is, Patent Literature 2 discloses that the outer circumstance of the annular core piece is provided with the recess for receiving a weld joint inside a contour of the outer circumstance of the annular core piece. Also, Patent Literature 2 discloses that the inside of the recess is provided with the raised part and the raised part is formed with the weld joint.

CITATION LIST

Patent Literature

Patent Literature 1: JP-A-2013-123345
Patent Literature 2: JP-A-2008-141904

SUMMARY OF INVENTION

Technical Problem

The present inventor has studied an annular core piece constructed so that the invention described in Patent Literature 1, 2 is applied to the annular core piece and deformation of the annular core piece inside the laminating die is prevented and also the deposited metal is not projected to the outside of the annular core. According to teaching of Patent Literature 1, 2, it is necessary to separately provide the outer circumstance of the annular core piece with the recess (hereinafter called a "recess for engagement") engaged to the protrusion included in the laminating die and the recess (hereinafter called a "recess for welding") for receiving the weld joint. As a result, it is necessary to provide the outer circumstance of the annular core piece with many recesses.

The annular core is generally shrink-fitted and fixed into a casing forming an outer shell of a rotating electric machine. The annular core shrink-fitted and fixed into the casing is subjected to a shrink-fitting pressure from the casing. But, since a region formed with the recess on the outer circumstance of the annular core piece does not make contact with the casing, the region is not subjected to the shrink-fitting pressure. Accordingly, when the outer circumstance of the annular core piece is provided with many recesses, the range subjected to the shrink-fitting pressure becomes narrower, thus concentrating the shrink-fitting pressure in a region that is not formed with the recess on the outer circumstance of the annular core piece. As a result, the annular core tends to be deformed or damaged. Also, when a shrink-fitting margin, that is, the shrink-fitting pressure is decreased in order to avoid deformation or damage to the annular core, a holding force by which the casing holds the annular core is decreased. Accordingly, when the outer circumstance of the annular core piece is provided with many recesses, a problem of becoming difficult to shrink-fit and fix the annular core into the casing arises.

Also, when the outer circumstance of the annular core piece is formed with the recess, the width of a yoke becomes narrower in the region formed with the recess. As a result, the area of a magnetic flux flow in the yoke, that is, the width of a magnetic path becomes narrower, thus decreasing efficiency of the rotating electric machine (electric motor, electric generator). An increase in the number of recesses formed on the outer circumstance of the annular core piece, that is, an increase in the number of regions in which the width of the magnetic path is narrowed decreases efficiency greatly. As a result, generated torque is decreased in the rotating electric motor, and generated electric power is decreased in the rotating electric generator. Accordingly, when the outer circumstance of the annular core piece is provided with many recesses, a problem of decreasing the efficiency of the rotating electric machine also arises.

The present invention has been implemented in view of such circumstances, and provides an annular core piece in which deformation of the annular core piece inside a laminating die can be prevented and also a weld joint can be received inside a contour of an outer circumstance of the annular core piece and the number of recesses formed on the outer circumstance is small. Also, the present invention provides an annular core formed by laminating the annular core pieces.

Solution to Problem

In order to solve the above problems, an annular core piece according to the present invention is an annular core piece including a plurality of recesses opened in an outer circumferential part, and the recess includes a bottleneck part and a raised part, and a transverse width of the bottleneck part is made narrower than a transverse width of a different region present on a side of a bottom of the recess further beyond the bottleneck part, and the raised part is formed such that a part of the bottom of the recess is raised and projected toward an opening end of the recess.

A vertex of the raised part may be inside the recess, and may be formed in a position separated from the opening end.

The bottleneck part may be formed on the opening end of the recess.

The bottleneck part may be formed in the position separated from the opening end of the recess.

A contour of the recess may be formed by a continuous curved line.

A contour of the recess may be formed by straight lines only.

An annular core according to the present invention is formed by laminating any of the annular core pieces.

An annular core piece according to the present invention is an annular core piece including a plurality of recesses opened in an outer circumferential part, and the recess includes a bottleneck part, and a transverse width of the bottleneck part is made narrower than a transverse width of a different region present on a side of a bottom of the recess further beyond the bottleneck part, and at least one of the plurality of recesses differs from a different recess in shape.

The raised parts of the annular core pieces adjacent in a lamination direction may be mutually welded.

Advantageous Effects of Invention

Since the plurality of recesses opened in the outer circumferential part of the annular core piece according to the present invention include the bottleneck parts, by laminating the annular core pieces while protrusions of a laminating die are engaged to the recesses and the annular core pieces are fixed using the laminating die, a pull force can be applied to the annular core piece to prevent deformation (swell or looseness) of the annular core piece inside the laminating die. Also, since the recesses include the raised parts, after the annular core pieces are laminated, the raised parts of the annular core pieces adjacent in the lamination direction are mutually welded to couple the annular core pieces, and this can receive a weld joint inside the recess. Accordingly, the recess of the annular core piece according to the present invention has a function as a recess for engagement and a function as a recess for welding. As a result, the present invention can decrease the number of recesses opened in the outer circumstance of the annular core piece since it is unnecessary to separately provide the outer circumstance of the annular core piece with the recess for engagement and the recess for welding.

Further, since the present invention can decrease the number of recesses opened in the outer circumferential part of the annular core piece, when the annular core is shrink-fitted and fixed into a casing, a shrink-fitting force applied to the annular core can be distributed over a wider range. Accordingly, deformation or damage to the annular core due to the shrink-fitting force can be made resistant to occurring. Alternatively, since the shrink-fitting force allowable in the annular core can be increased, the annular core can tightly be fixed to the casing. This can easily shrink-fit and fix the annular core into the casing.

Also, the present invention can decrease the number of regions in which the width of a magnetic path is narrowed since the recesses having the functions of the recess for engagement and the recess for welding are formed rather than separately forming the recess for engagement and the recess for welding.

DESCRIPTION OF EMBODIMENTS

A concrete embodiment of the present invention will hereinafter be described properly with reference to the drawings.

(Annular Core Piece)

Figure 1:
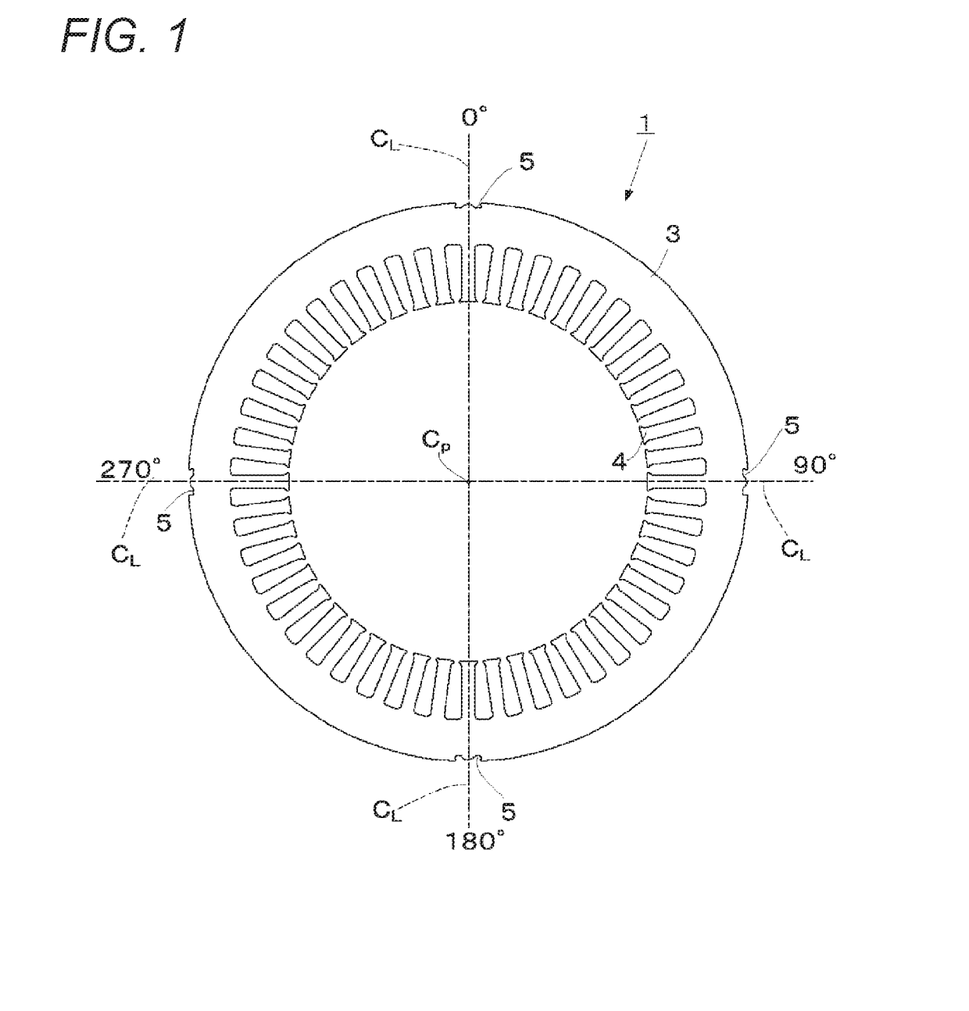
FIG. 1 is a plan view showing an outer shape of an annular core piece according to an embodiment of the present invention.

FIG. 1 is a plan view showing an outer shape of an annular core piece 1 according to an embodiment of the present invention. The annular core piece 1 is a member forming an annular core 2 (not shown in FIG. 1) by laminating a plurality of annular core pieces 1, and is manufactured by blanking a thin sheet of an electromagnetic steel plate. As shown in FIG. 1, the annular core piece 1 includes a yoke 3 forming an outer shell of the annular core piece 1, and forty-eight teeth 4 projected to the inner diameter side of the yoke 3.

An outer circumstance of the yoke 3 is formed with four recesses 5. The recesses 5 are evenly spaced in a circumferential direction of the yoke 3. That is, the recesses 5 are described using a central angle with reference to the rotation center CP of the annular core piece 1, and the recesses 5 are spaced so that central lines CL are in positions of the central angles of 0°, 90°, 180° and 270°.

(Recess)

Figure 2:
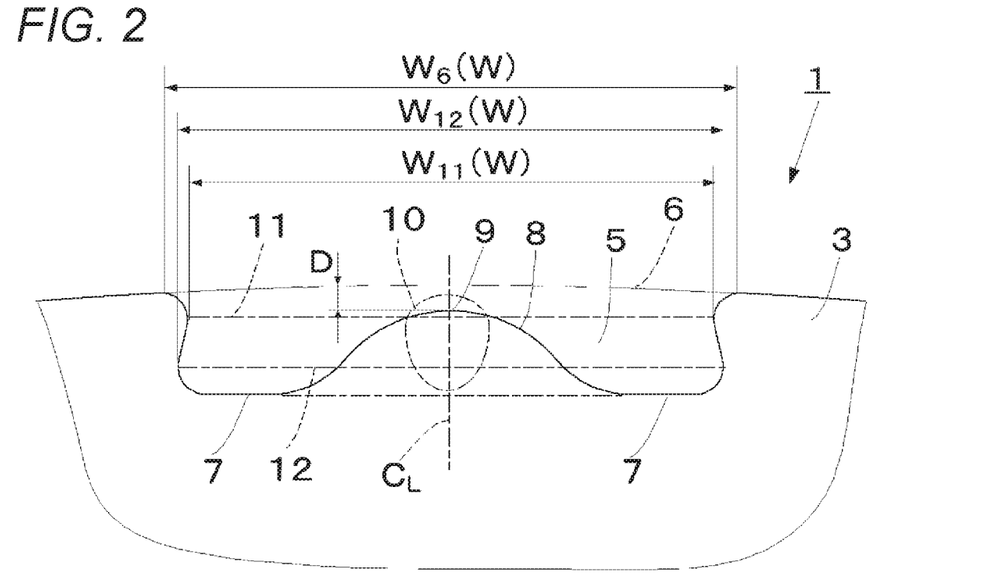
FIG. 2 is a plan view enlarging and showing an outer shape of a recess included in the annular core piece described in FIG. 1.

FIG. 2 is an enlarged plan view of the annular core piece 1 showing the recess 5. Hereinafter, the portion overlapping with a contour of the outer circumstance of the yoke 3 in the recess 5 is called an opening end 6 as shown in FIG. 2. The opening end 6 refers to a virtual contour line in the recess 5. In the virtual contour line, the contour of the outer circumstance of the yoke 3 should be present if the recess 5 is absent. The opening end 6 can easily be drawn from the diameter of the yoke 3 and a central point of the yoke 3. The deepest portion of the recess 5, that is, the portion farthest from the contour of the outer circumstance of the yoke 3 in the recess 5 is called a bottom 7. Inside the recess 5, a raised part 8 is present, and the raised part 8 is projected from the bottom 7 toward the opening end 6. That is, a contour of the raised part 8 is raised from the bottom 7. A vertex 9 of the raised part 8 is in a position separated from the opening end 6 by a depth D. In addition, the depth D is determined so that a deposited metal 10 formed after welding the raised part 8 is not bulged beyond the opening end 6. Accordingly, the deposited metal 10 is not projected to the outside of the opening end 6.

In addition, the bottom 7 of the recess 5 may have a plurality of regions projected to the radial inside. The bottom 7 of the recess 5 may be provided with a plurality of projected regions having the same shape. For example, the whole bottom 7 of the recess 5 may have a corrugated shape or a serrated shape like teeth of a saw. In this case, each of the projected regions is the raised part 8. Alternatively, the bottom 7 of the recess 5 may be provided with a plurality of projected regions having different projection lengths. In this case, the region having the longest projection length, of the plurality of regions projected to the radial inside, may be regarded as the raised part 8.

In a contour of the recess 5, only the bottom 7 is formed by a straight line, and the other portion is formed by a curved line. And, connection between the straight line and the curved line forming the contour of the recess 5 is made smoothly. Also, the contour of the recess 5 is bilaterally symmetric with respect to the central line CL. In short, the contour of the recess 5 is formed by the straight line and the curved lines continuous smoothly, and has a shape bilaterally symmetric with respect to the central line CL. In addition, as shown in FIG. 1, the recess 5 is arranged so that the central line CL passes through the rotation center CP of the annular core piece 1. Also, the transverse width W of the recess 5 indicates an opposed distance of a contour line of the recess 5 measured in a direction orthogonal to the central line CL.

As shown in FIG. 2, the transverse width W of the recess 5 becomes narrower gradually from the opening end 6 toward the bottom 7, and becomes narrowest in a narrowed part 11. Then, the transverse width W of the recess 5 becomes wider gradually toward the bottom 7 beyond the narrowed part 11, and becomes widest in a widened part 12. The size of the transverse width W of the recess 5 in the narrowed part 11 is set at W11. The size of the transverse width W of the recess 5 in the widened part 12 is set at W12.

When the size of the transverse width W of the recess 5 in the opening end 6 is set at W6, the following relation holds between W6, W11, W12.

$$W6 > W11, W11 < W12$$

As described above, the widened part 12 is in a position separated from the opening end 6 to the radial inside further beyond the narrowed part 11, and the size W12 of the transverse width W of the widened part 12 is larger than the size W11 of the transverse width W of the narrowed part 11. Accordingly, since the size W11 of the narrowed part 11 is smaller than other region in a position further deeper from the narrowed part 11 in the recess 5, that is, the size W12 of the widened part 12, the narrowed part 11 corresponds to a bottleneck part in the recess 5.

A laminating die (not shown) includes a protrusion having the same contour as that of the recess 5. In the case of engaging this protrusion to the recess 5, when the protrusion attempts to be disengaged from the recess 5 by pulling the annular core piece 1 in a direction away from this protrusion, the protrusion cannot pass through the narrowed part 11, that is, the bottleneck part. Accordingly, the recess 5 functions as a kind of dovetail groove. As a result, this protrusion restricts deformation of the annular core piece 1, thus preventing deformation of the annular core piece 1 inside the laminating die. Accordingly, the recess 5 functions as a recess for engagement.

In addition, the narrowed part 11 is not limited to the region with the minimum transverse width W in the recess 5. A position separated from the opening end 6 further beyond the widened part 12 may be formed with a region in which the transverse width W is smaller than W11. Also in this case, since the relation of W11<W12 holds, the recess 5 functions as the recess for engagement. Also, the widened part 12 is not limited to the region with the maximum transverse width W in the recess 5. For example, W6 may be larger than W11. Also in this case, since the relation of W11<W12 holds, the recess 5 functions as the recess for engagement.

Also, as described above, the recess 5 includes the raised part 8 raised from the bottom 7. The vertex 9 of the raised part 8 is inside the recess 5, and is in the position separated from the opening end 6. The depth D of the vertex 9 measured from the opening end 6 is determined so that the deposited metal 10 formed after welding the raised part 8 is not bulged beyond the opening end 6. For example, the depth D is 0.0 mm to 0.5 mm, preferably, 0.1 mm to 0.3 mm.

Accordingly, when the raised parts 8 of the annular core pieces 1 adjacent in a lamination direction are mutually welded to couple the annular core pieces 1, the deposited metal 10 is not projected to the outside of the outer circumstance of the annular core piece 1. When the annular core 2 is fitted into a casing (not shown), the deposited metal does not interfere with the casing. Since a weld joint for mutually coupling the laminated annular core pieces 1 is received inside the recess 5 in this manner, the recess 5 functions as a recess for welding.

Accordingly, the recess 5 has a function as the recess for engagement and a function as the recess for welding. When the annular core piece 1 separately includes the recess for engagement and the recess for welding, it is necessary to include four recesses for engagement and four recesses for welding, that is, a total of eight recesses. On the other hand, the annular core piece 1 only includes four recesses 5, and this can achieve equivalent functions.

MODIFIED EXAMPLES

The shape of the recess 5 included by the annular core piece 1 is not limited to the shape shown in FIG. 2. In the recess 5, various modified examples are assumed. A part of the modified examples of the recess 5 will hereinafter be illustrated.

First Modified Example

Figure 3:
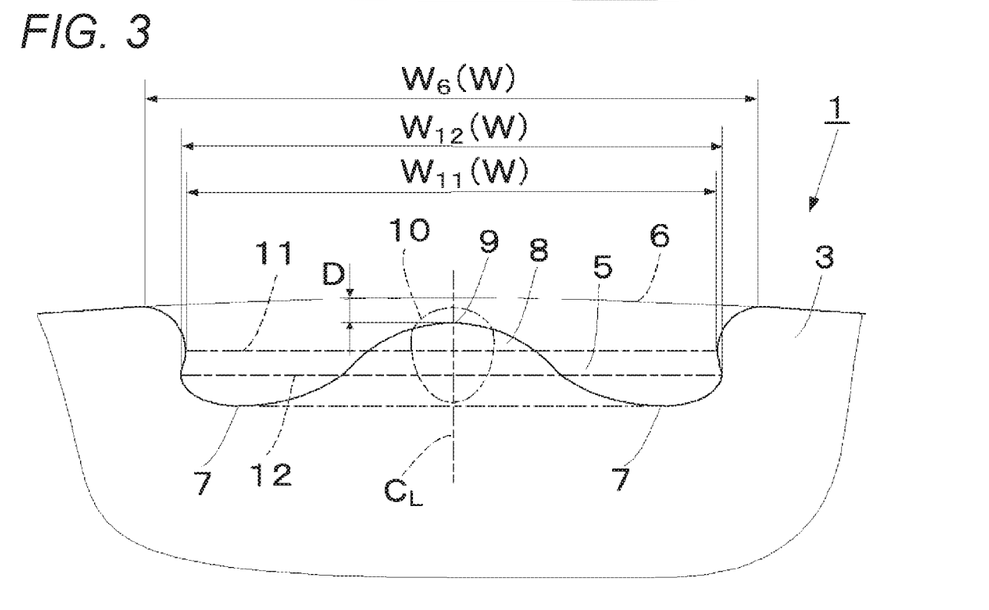
FIG. 3 is a plan view enlarging and showing an outer shape of a recess included in an annular core piece according to a first modified example of the present invention.

FIG. 3 is a plan view of an annular core piece 1 enlarging and showing a recess 5 of the annular core piece 1 according to a first modified example of the present invention. As shown in FIG. 3, the recess 5 according to the first modified example also includes a raised part 8, a narrowed part 11 and a widened part 12 like the recess 5 according to the embodiment. However, the recess 5 according to the first modified example differs from the recess 5 according to the embodiment in that a contour of the recess 5 according to the first modified example is formed by only a plurality of continuous curved lines, that is, the contour does not include a straight line portion.

However, also in the recess 5 according to the first modified example, the following relation holds for the sizes of the transverse widths W of an opening end 6, the narrowed part 11 and the widened part 12, that is, W6, W11, W12.

W6>W11, W11<W12

Accordingly, the recess 5 according to the first modified example is also formed with a bottleneck part in the narrowed part 11. As a result, the recess 5 according to the first modified example functions as a kind of dovetail groove. That is, the recess 5 according to the first modified example also functions as a recess for engagement.

The recess 5 according to the first modified example also includes the raised part 8 raised from a bottom 7, and a vertex 9 of the raised part 8 is inside the recess 5 and is in a position separated from the opening end 6. The depth D of the vertex 9 measured from the opening end 6 is determined so that a deposited metal 10 formed after welding the raised part 8 is not bulged beyond the opening end 6. Accordingly, when the raised parts 8 of the annular core pieces 1 adjacent in a lamination direction are mutually welded to couple the annular core pieces 1, the deposited metal 10 is not projected to the outside of an outer circumstance of the annular core piece 1. Since a weld joint for mutually coupling the laminated annular core pieces 1 is received inside the recess 5 in this manner, the recess 5 according to the first modified example functions as a recess for welding.

Accordingly, the recess 5 according to the first modified example also has a function as the recess for engagement and a function as the recess for welding. When the annular core piece 1 separately includes the recess for engagement and the recess for welding, it is necessary to include four recesses for engagement and four recesses for welding, that is, a total of eight recesses. However, the annular core piece 1 according to the first modified example only includes four recesses 5, and this can achieve equivalent functions.

Second Modified Example

Figure 4:
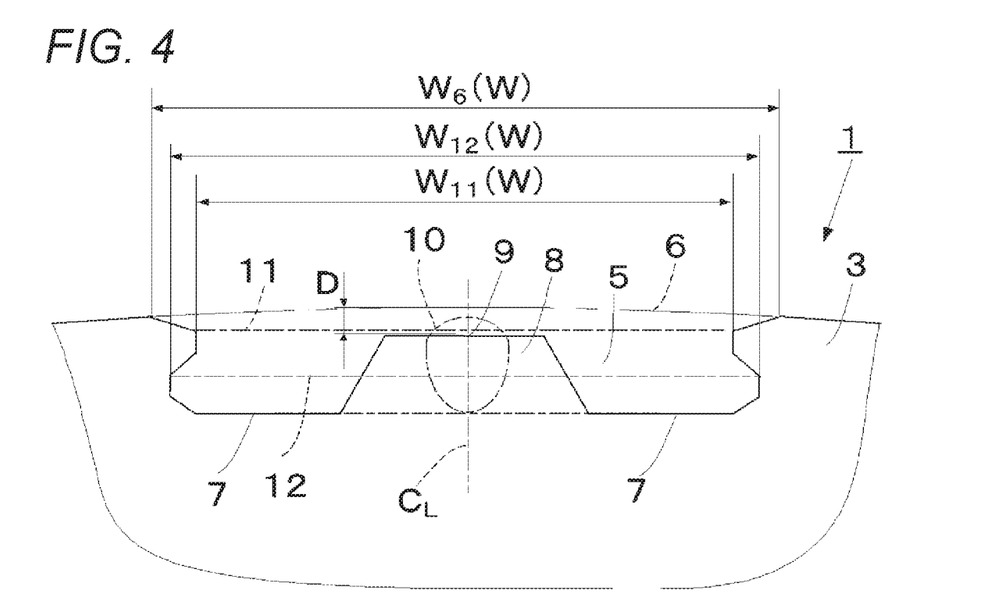
FIG. 4 is a plan view enlarging and showing an outer shape of a recess included in an annular core piece according to a second modified example of the present invention.

FIG. 4 is a plan view of an annular core piece 1 showing a recess 5 of the annular core piece 1 according to a second modified example of the present invention. As shown in FIG. 4, the recess 5 according to the second modified example also includes a raised part 8, a narrowed part 11 and a widened part 12 like the recess 5 according to the embodiment. However, the recess 5 according to the second modified example differs from the recesses 5 according to the embodiment and the first modified example in that a contour of the recess 5 according to the second modified example is formed by straight lines only.

However, also in the recess 5 according to the second modified example, the following relation holds for the sizes of the transverse widths W of an opening end 6, the narrowed part 11 and the widened part 12, that is, W6, W11, W12.

W6>W11, W11<W12

Accordingly, the recess 5 according to the second modified example is also formed with a bottleneck part in the narrowed part 11. As a result, the recess 5 according to the second modified example functions as a kind of dovetail groove. That is, the recess 5 according to the second modified example functions as a recess for engagement.

The recess 5 according to the second modified example also includes the raised part 8 raised from a bottom 7, and a vertex 9 of the raised part 8 is inside the recess 5 and is in a position separated from the opening end 6. And, the depth D of the vertex 9 measured from the opening end 6 is determined so that a deposited metal 10 formed after welding the raised part 8 is not bulged beyond the opening end 6. Accordingly, when the raised parts 8 of the annular core pieces 1 adjacent in a lamination direction are mutually welded to couple the annular core pieces 1, the deposited metal 10 is not projected to the outside of an outer circumstance of the annular core piece 1. Since a weld joint for mutually coupling the laminated annular core pieces 1 is received inside the recess 5 in this manner, the recess 5 according to the second modified example functions as a recess for welding.

Accordingly, the recess 5 according to the second modified example also has a function as the recess for engagement and a function as the recess for welding. When the annular core piece 1 separately includes the recess for engagement and the recess for welding, it is necessary to include four recesses for engagement and four recesses for welding, that is, a total of eight recesses. However, the annular core piece 1 according to the second modified example only includes four recesses 5, and this can achieve equivalent functions.

Third Modified Example

Figure 5:
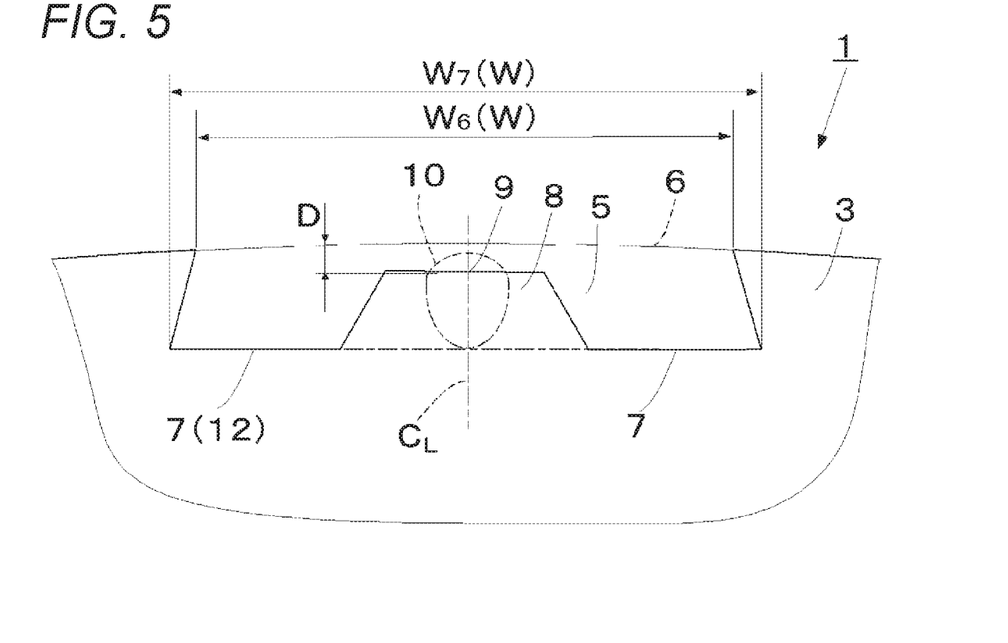
FIG. 5 is a plan view enlarging and showing an outer shape of a recess included in an annular core piece according to a third modified example of the present invention.

FIG. 5 is a plan view of an annular core piece 1 showing a recess 5 of the annular core piece 1 according to a third modified example of the present invention. The embodiment and the first and second modified examples show the example in which a narrowed part 11 in a position separated from an opening end 6 is formed with a bottleneck part, but a region formed with the bottleneck part is not limited to the region in the position separated from the opening end 6. As shown in FIG. 5, when the transverse width W6 of the recess 5 in the opening end 6 is made smaller than the transverse width W7 in a bottom 7, the opening end 6 is formed with the bottleneck part. Accordingly, the recess 5 is allowed to function as a kind of dovetail groove. That is, the recess 5 according to the third modified example functions as a recess for engagement.

The recess 5 according to the third modified example also includes a raised part 8 raised from the bottom 7, and a vertex 9 of the raised part 8 is inside the recess 5 and is in a position separated from the opening end 6. And, the depth D of the vertex 9 measured from the opening end 6 is determined so that a deposited metal 10 formed after welding the raised part 8 is not bulged beyond the opening end 6. Accordingly, when the raised parts 8 of the annular core pieces 1 adjacent in a lamination direction are mutually welded to couple the annular core pieces 1, the deposited metal 10 is not projected to the outside of an outer circumstance of the annular core piece 1. Since a weld joint for mutually coupling the laminated annular core pieces 1 is received inside the recess 5 in this manner, the recess 5 according to the third modified example functions as a recess for welding.

Accordingly, the recess 5 according to the third modified example also has a function as the recess for engagement and a function as the recess for welding. When the annular core piece 1 separately includes the recess for engagement and the recess for welding, it is necessary to include four recesses for engagement and four recesses for welding, that is, a total of eight recesses. However, the annular core piece 1 according to the third modified example only includes four recesses 5, and this can achieve equivalent functions.

(Annular Core)

Figure 6:
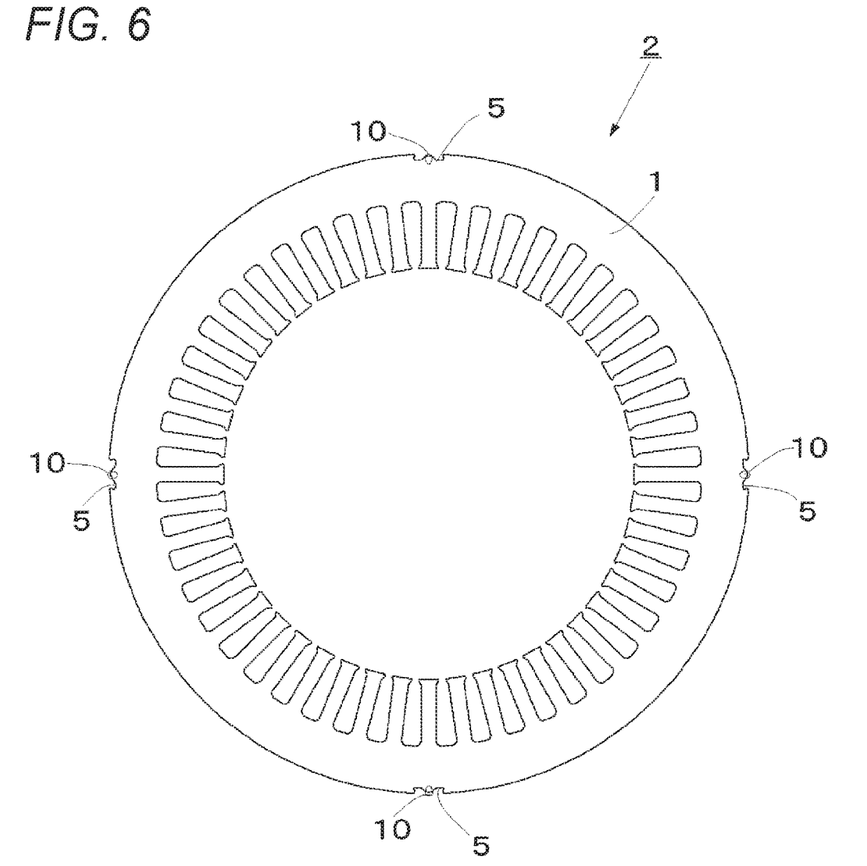
FIG. 6 is a plan view showing an outer shape of an annular core according to the embodiment of the present invention.

FIG. 6 is a plan view of an annular core 2 formed by laminating the annular core pieces 1 described in FIG. 1 in a lamination direction. The annular core 2 is formed by laminating the annular core pieces 1 described in FIG. 1. Then, the raised part 8 formed inside the recess 5 is welded. That is, the raised parts 8 of the annular core pieces 1 adjacent in the lamination direction are mutually welded to mutually couple the annular core pieces 1. As a result, the raised part 8 is formed with the deposited metal 10 as shown in FIG. 6. As described above, since the raised part 8 is formed away from the opening end 6 so that the deposited metal 10 is not bulged beyond the opening end 6, the deposited metal 10 is not bulged beyond the opening end 6. Accordingly, when the annular core 2 is fitted into a casing (not shown), the deposited metal 10 does not interfere with the casing.

Also, as described above, the recess 5 of the annular core piece 1 has a function as the recess for engagement and a function as the recess for welding. When the annular core piece 1 separately includes the recess for engagement and the recess for welding, it is necessary to include four recesses for engagement and four recesses for welding, that is, a total of eight recesses. However, the annular core piece 1 only includes four recesses 5, and this can achieve equivalent functions. Accordingly, half in the case of separately including the recess for engagement and the recess for welding suffices for the number of recesses 5 formed on the outer circumstance of the annular core 2. This can expand the range subjected to a shrink-fitting pressure of the annular core 2 when the annular core 2 is shrink-fitted and fixed into the casing (not shown). Accordingly, since the annular core 2 is subjected to a shrink-fitting force over a wide range, stress applied to the annular core 2 is decreased, and the occurrence of deformation or damage to the annular core 2 can be prevented. Also, the shrink-fitting force allowable in the annular core 2 can be increased. This can easily tightly fix the annular core 2 to the casing.

Also, the recess 5 included in the yoke 3 of the annular core 2 shown in the embodiment has functions of the recess for engagement and the recess for welding. Accordingly, half in a conventional product can suffice for the number of recesses 5 in the annular core 2, thus decreasing the number of regions in which the width of a magnetic path is narrowed. Accordingly, instead of the conventional product, the annular core pieces 1 shown in the embodiment are laminated to form the annular core 2, thereby improving efficiency of a rotating electric machine including the annular core 2. As a result, generated torque is increased in a rotating electric motor, and generated electric power is increased in a rotating electric generator.

As described above, the recess 5 included in the annular core piece 1 according to each of the embodiment and the modified examples has a function as the recess for engagement and a function as the recess for welding. Accordingly, the annular core piece 1 can decrease the number of recesses 5 as compared with the case of separately including the recess for engagement and the recess for welding. Since the annular core 2 has a smaller number of recesses 5 as compared with the case of separately including the recess for engagement and the recess for welding, the annular core 2 can be subjected to a shrink-fitting force over a wide range when the annular core 2 is shrink-fitted and fixed into the casing (not shown). Accordingly, the occurrence of deformation or damage to the annular core 2 can be prevented. The shrink-fitting force allowable in the annular core 2 can be increased, and this can tightly fix the annular core 2 to the casing.

In addition, the technical scope of the present invention is not limited by the embodiment and the modified examples. The present invention can freely be implemented by making modifications, applications and improvements within the technical idea described in claims.

For example, the number of recesses 5 included in the annular core piece 1 is not particularly limited, and may be two, three, or five or more. However, in order to prevent the occurrence of deformation or damage to the annular core 2 and increase the shrink-fitting force allowable in the annular core 2, it is desirable to decrease the number of recesses 5.

FIG. 1 shows the example in which the central lines CL of the recesses 5 are arranged at 90° pitches of the central angle with reference to the rotation center CP of the annular core piece 1, but the annular core piece 1 is not limited to the example in which the recesses 5 are evenly spaced on the circumference of the annular core piece 1. A spacing of the recesses 5 on the circumference of the annular core piece 1 may vary according to blanking layout. For example, the recesses 5 may be arranged so that the central angles with reference to the rotation center CP of the annular core piece 1 of the central lines CL of the recesses 5 are 0°, 85°, 180° and 265°.

The shapes of the contours of the recesses 5 shown in FIGS. 2 to 5 are illustrative, and the shape of the contour of the recess 5 is not limited to these shapes. The contour of the recess 5 may be formed by only a continuous smooth curved line, by only a straight line, or may include a flexure point. The contour of the recess 5 may be formed by only a curved line, or by a curved line and a straight line.

Also, FIGS. 2 and 3 show the example in which the contour of the recess 5 is mainly formed by the curved lines, but the contour of the recess 5 may be mainly formed by straight lines, and the corner in which the two straight lines are connected may be rounded. Or, the corner may be chamfered. In the contour of the recess 5 shown in FIGS. 4 and 5, the corner may be rounded, or the corner may be chamfered. In addition, chamfering of the corner may be C-chamfering with an inclination angle of 45°.

Also, the size of the recess 5 is freely selected for design, and is not particularly limited. However, in order to ensure mechanical performance of the recess 5, that is, in order that the recess 5 performs a function as the recess for engagement and a function as the recess for welding, the recess 5 requires a certain level of size or more. On the other hand, in order to ensure electromagnetic performance of the annular core 2, that is, in order to ensure the width of a magnetic path necessary for the yoke 3, the size of the recess 5, particularly, the depth of the recess 5 is preferably smaller. Accordingly, the size of the recess 5 is determined by trading off the mechanical performance of the recess 5 for the electromagnetic performance of the annular core 2.

Also, FIGS. 2 to 5 show the example in which the recess 5 has the shape bilaterally symmetric with respect to the central line CL, but the recess 5 is not limited to the shape bilaterally symmetric with respect to the central line CL. The recess 5 may have a shape bilaterally asymmetric with respect to the central line CL.

In a position in which the recess 5 is formed with the bottleneck part, any position intermediate between the opening end 6 and the bottom 7 can be selected. However, the bottom 7 is not formed with the bottleneck part. That is, any position other than the bottom 7 can be formed with the bottleneck part.

The recess 5 may include a plurality of bottleneck parts. For example, a certain position may be formed with a first bottleneck part, and a region far from the opening end 6 beyond the first bottleneck part may be formed with a first widened part 12 having a transverse width W larger than that of the first bottleneck part, and a region far from the opening end 6 beyond the first widened part 12 may be formed with a second bottleneck part having a transverse width W smaller than that of the first widened part 12, and a region far from the opening end 6 further beyond the second bottleneck part may be formed with a second widened part 12 having a transverse width W larger than that of the second bottleneck part.

The bottleneck part included by the recess 5 may have the length in a depth direction of the recess 5. For example, as shown in FIG. 4, when regions in which the transverse width W of the recess 5 is equal to the transverse width W11 of the narrowed part 11 are continuous in the depth direction of the recess 5, all the regions in which the transverse width W is equal to the transverse width W11 correspond to the bottleneck parts.

Figure 7:
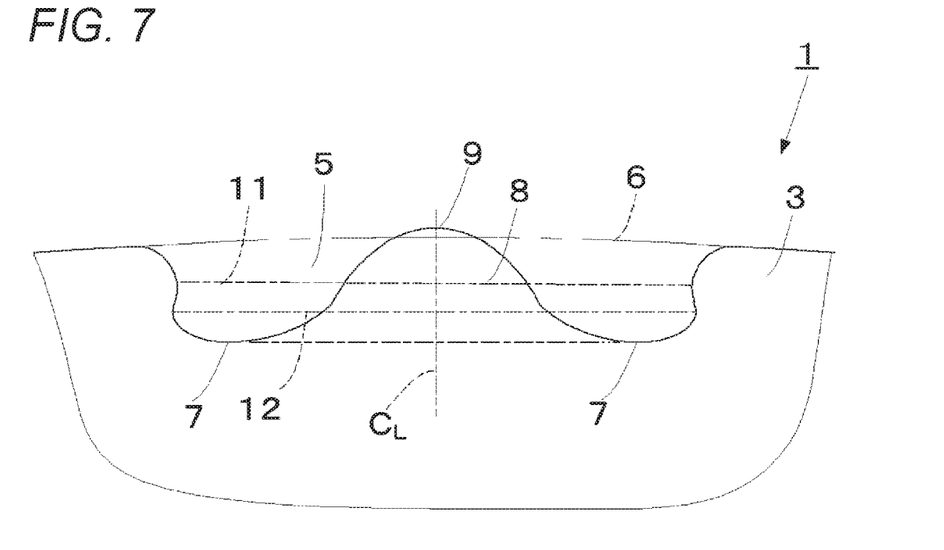
FIG. 7 is a plan view enlarging and showing an outer shape of a recess included in an annular core piece according to a fourth modified example of the present invention.

FIGS. 2 to 5 show the example in which the vertex 9 of the raised part 8 is in the position separated from the opening end 6 by the depth D, but the raised part 8 is not limited to the example in which the raised part 8 is not projected to the outside of the recess 5. As shown in FIG. 7, the vertex 9 of the raised part 8 may be slightly projected to the outside of the recess 5, that is, the outside of the opening end 6. When the projection height of the raised part 8 is properly set, in the process of welding, a part of the raised part 8 melts and adheres to the periphery of the raised part 8, and the raised part 8 is not projected to the outside of the opening end 6.

Figure 8:
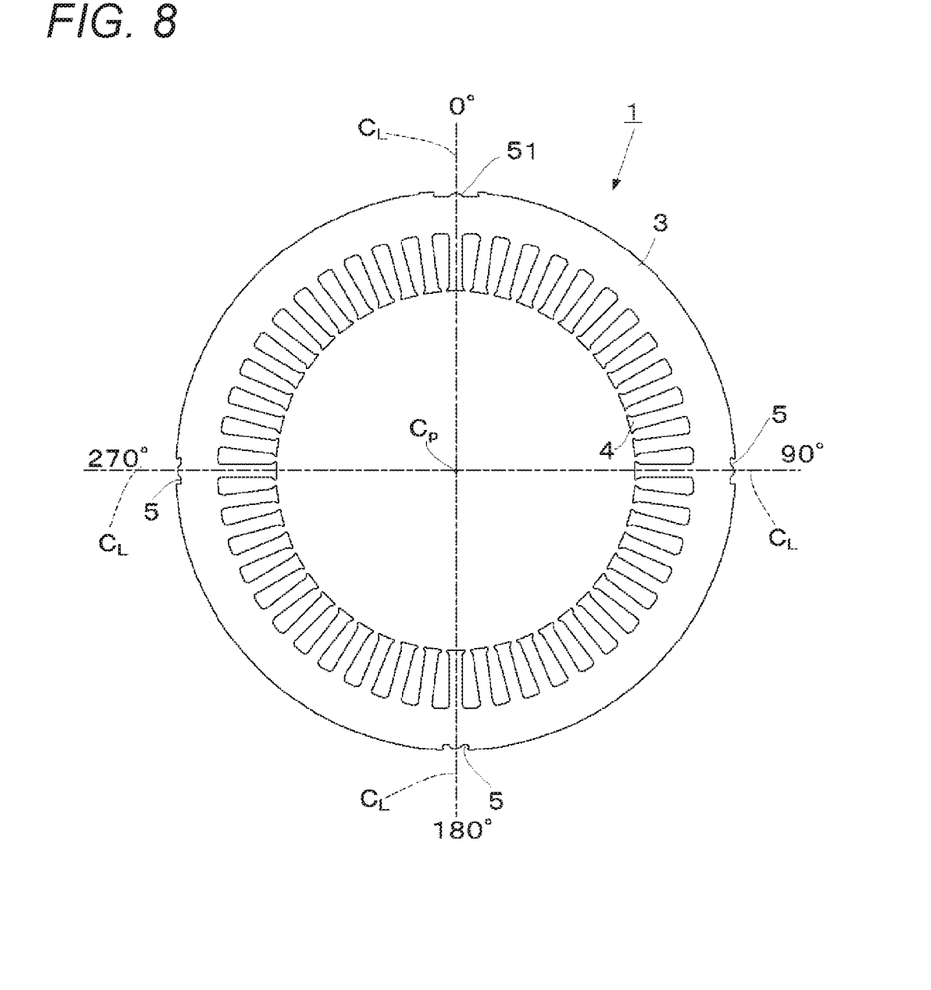
FIG. 8 is a plan view showing an outer shape of an annular core piece according to a fifth modified example of the present invention.

The annular core piece 1 is not limited to the example in which all the recesses 5 have the same shape. As shown in FIG. 8, at least one recess 51 of the plurality of recesses 5 included in the annular core piece 1 may differ from the other recesses 5 in shape. For example, by changing the width or depth of the recess 5, or by adding a notch or a protrusion inside the recess 5, such a recess 5 may differ from the other recesses 5 in shape. In FIG. 8, the width of the recess 51 is wider than the width of each of the other recesses 5. This can easily make a rotation and lamination check of identifying the boundary of rotation and lamination, or row identification of identifying a row blanked from an electromagnetic steel plate for multiple rows. When the annular core piece 1 is manufactured using a plurality of dies, it can easily be determined which dies blank its annular core piece 1.

The shapes of the annular core piece 1 and the annular core 2 shown in FIGS. 1 and 6 are illustrative. Particularly, the shapes and the number of teeth 4 included in the annular core piece 1 and the annular core 2 are not limited to the example shown in FIGS. 1 and 6. The annular core piece 1 and the annular core 2 may have shape features that are not shown in FIGS. 1 and 6.

A method for welding the annular core pieces 1 adjacent in the lamination direction is not particularly limited. The annular core piece 1 may be welded by TIG welding or laser welding. Alternatively, other welding methods may be applied to the annular core pieces 1.

Also, the embodiment shows the example in which the annular core 2 is shrink-fitted and fixed into the casing, but the annular core 2 is not limited to the example shrink-fitted and fixed into the casing. The annular core 2 may be bolted to the casing. For example, a plurality of regions further projected to the outside of the outer circumstance of the annular core 2 may be included, and the regions may be formed with bolt insertion holes, and bolts inserted into the bolt insertion holes may be screwed into the casing.

Also, the recess 5 may be a recess without the raised part 8. And, at least one recess 5 of the plurality of recesses 5 included in the annular core piece 1 may differ from the other recesses 5 in shape. For example, by changing the width or depth of the recess 5, or by adding a notch or a protrusion inside the recess 5, such a recess 5 may differ from the other recesses 5 in shape. This can easily make a rotation and lamination check of identifying the boundary of rotation and lamination, or row identification of identifying a row blanked from an electromagnetic steel plate for multiple rows. When the annular core piece 1 is manufactured using a plurality of dies, it can easily be determined which dies blank its annular core piece 1.

The present application is based on Japanese patent application No. 2017-022766 filed on Feb. 10, 2017, the contents of which are hereby incorporated by reference.

INDUSTRIAL APPLICABILITY

The present invention provides an annular core piece in which deformation of the annular core piece inside a laminating die can be prevented and also a weld joint can be received inside a contour of an outer circumstance of the annular core piece and the number of recesses formed on the outer circumstance is small.

REFERENCE SIGNS LIST

1: ANNULAR CORE PIECE
2: ANNULAR CORE
3: YOKE
4: TEETH
5: RECESS
22
6: OPENING END
7: BOTTOM
8: RAISED PART
9: VERTEX
10: DEPOSITED METAL
11: NARROWED PART
12: WIDENED PART

The invention claimed is:
1. An annular core piece, comprising:
a recess opened in an outer circumferential part, wherein the recess includes:
a bottleneck part, and
a raised part;

the recess is configured to engage with a protrusion of a laminating die at a time of laminating the annular core piece, a transverse width of the bottleneck part is made narrower than a transverse width of a different region present on a side of a bottom of the recess further beyond the bottleneck part, the raised part is a portion to be welded, and the raised part is formed such that a part of the bottom of the recess is raised and projected toward an opening end of the recess, and the raised part of respective annular core pieces that are adjacent in a lamination direction are mutually welded and coupled.

2. The annular core piece according to claim 1, wherein a vertex of the raised part is inside the recess, and is formed in a position separated from the opening end.

3. The annular core piece according to claim 1, wherein the bottleneck part is formed on the opening end of the recess.

4. The annular core piece according to claim 1, wherein the bottleneck part is formed in the position separated from the opening end of the recess.

5. The annular core piece according to claim 1, wherein a contour of the recess is formed by a continuous curved line.

6. The annular core piece according to claim 1, wherein a contour of the recess is formed by straight lines only.

7. An annular core formed by laminating the annular core pieces according to claim 1.

8. The annular core piece according to claim 1, wherein the recess is a plurality of recesses, and at least one of the plurality of recesses differs from a different recess in shape.

9. An annular core piece, comprising:

a recess opened in an outer circumferential part, wherein the recess includes:

a bottleneck part, and a raised part;

a transverse width of the bottleneck part is made narrower than a transverse width of a different region present on a side of a bottom of the recess further beyond the bottleneck part, the raised part is formed such that a part of the bottom of the recess is raised and projected toward an opening end of the recess, and the raised part of respective annular core pieces that are adjacent in a lamination direction are mutually welded and coupled, wherein the recess includes a narrowed part that projects inwardly from sidewalls of the recess, the narrowed part having the bottleneck part, and at least a portion of the narrowed part faces sidewalls of the raised part.

* * * * *